Patented May 27, 1947

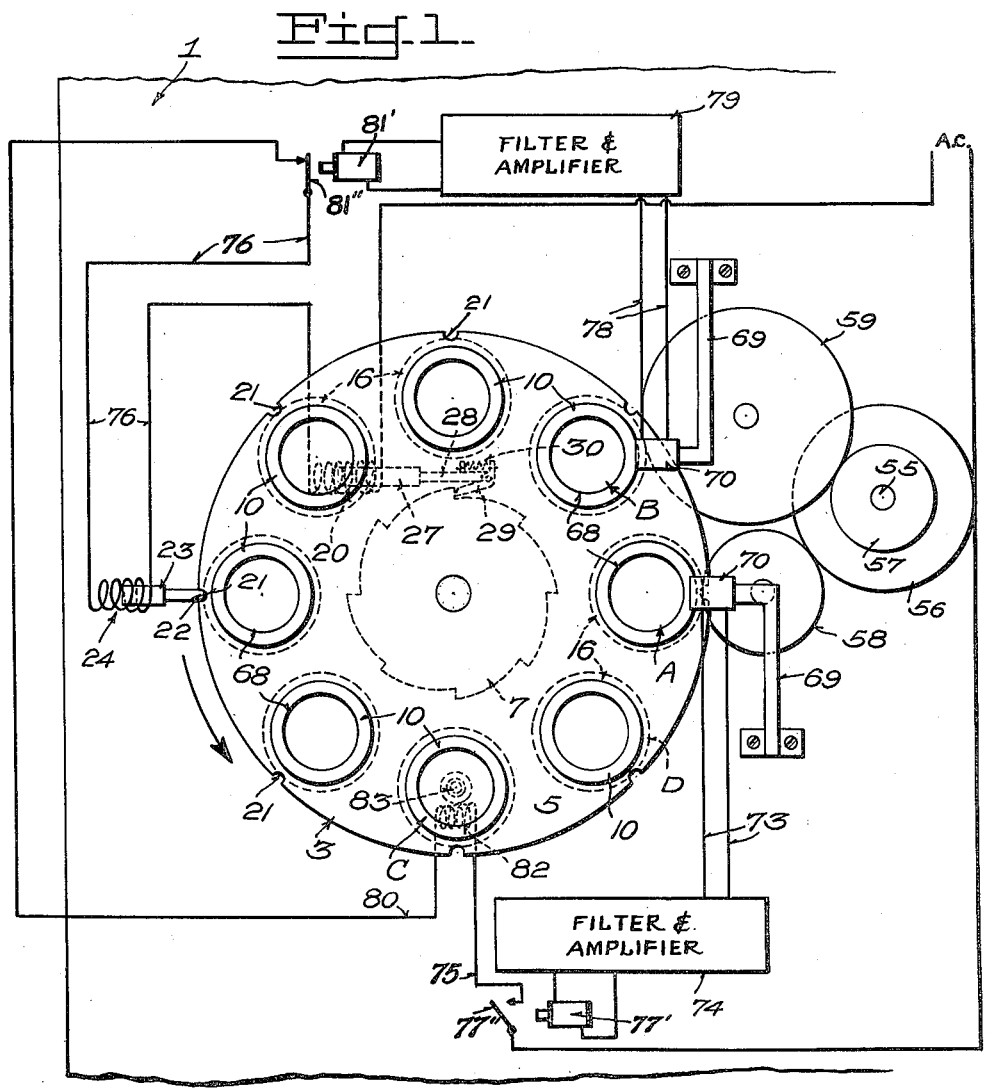

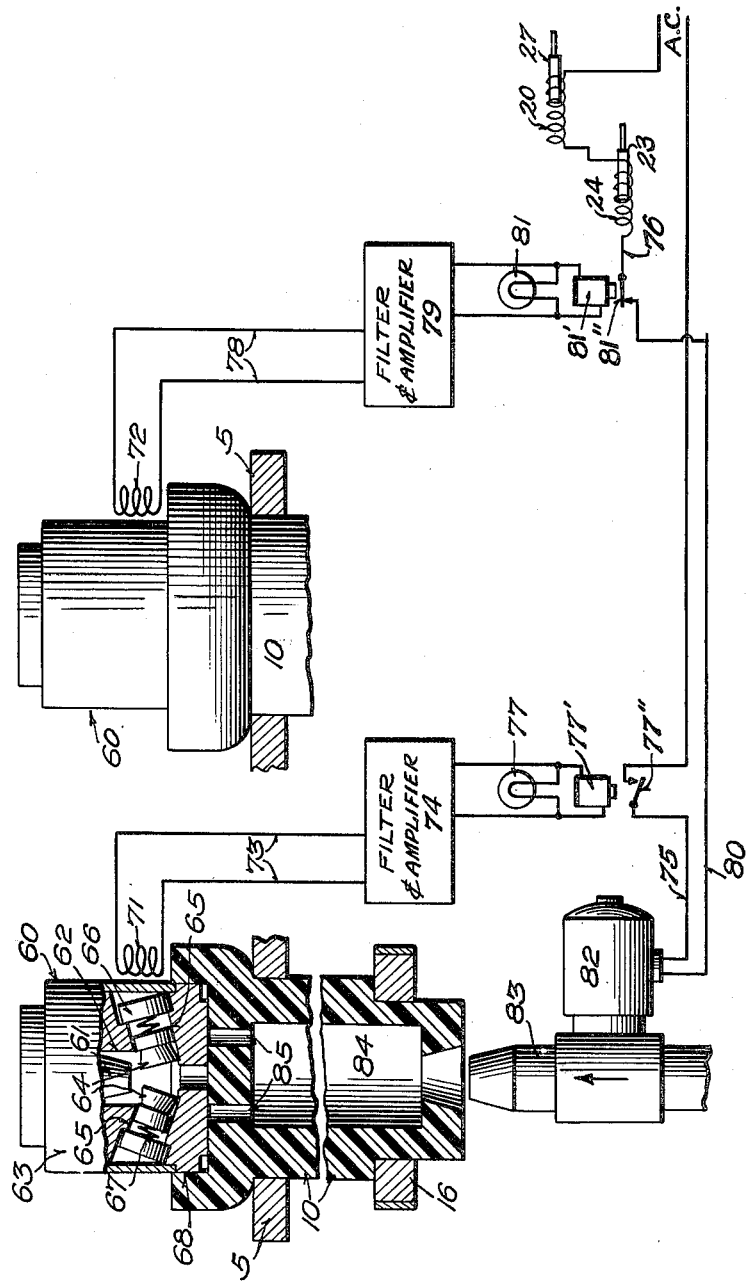

2,421,036

UNITED STATES PATENT OFFICE 2,421,036

METHOD AND APPARATUS FOR TESTING CENTRIFUGALLY ACTUATED MEMBERS

Leo T. Meister, Bradley Beach, N. J.

Application March 1, 1945, Serial No. 580,457

8 Claims. (Cl. 177—311)

1

The invention described herein may be manufactured and used by or for the Government for governmental purposes without the payment to me of any royalty thereon.

This invention relates to an apparatus for testing the operation of centrifugally actuated elements and more particularly to an apparatus designed for testing plungers of projectile fuzes which are moved outwardly by centrifugal force by the rotation of a projectile, in which the fuze is mounted, during flight, for arming the fuze.

It is a primary object of this invention to provide a device which is electrically operated through a current induced by the centrifugally actuated plungers, when magnetized and rotated, to control the operation of the apparatus for moving holders, containing the fuzes to be tested, intermittently to testing stations at which the fuzes are rotated at different speeds, for testing the arming and disarming action of the plungers.

Still another aim of the invention is to provide an apparatus which is substantially automatic in operation in that the fuzes, after being manually fed to the apparatus, are moved by a step by step motion to and past the testing stations and thereafter blast ejected from the apparatus if there are no imperfections in the operation of the fuze plungers.

Still a further aim of the invention is to provide a construction wherein two or more fuzes are tested simultaneously for different results and by means of which the apparatus will not function if either one of the fuzes, being tested, is imperfect, said apparatus, however, being provided with means for visually indicating the imperfect fuze.

Another object of the invention is to provide an apparatus to mount a fuze and to rotate the fuze at the speed it would be rotated by a projectile in flight, to test the operation of the safety elements in arming the fuze; and thereafter again revolving the fuze at a slower speed to test the safety elements to ascertain that they remain in disarmed positions.

Other objects and advantages of the invention will hereinafter become more fully apparent from the following description of the drawings, which illustrate a preferred embodiment thereof, and wherein:

Figure 1 is a diagrammatic view, partly in top plan, of the apparatus; and

Figure 2 is a diagrammatic view, partly in vertical section and partly in side elevation, of a portion of the apparatus.

Referring more particularly to the drawings, wherein like reference characters designate like or corresponding parts throughout the views, 3 designates generally the mechanical portion of the testing apparatus in its entirety and which is of the same construction as the mechanical part of the testing apparatus shown in my prior United States Patent No. 2,355,092, issued August 8, 1944, and to which reference is made for a full and complete illustration and description of the mechanical apparatus, which includes a base 1 above which is rotatably supported a disk 5, to which is connected a ratchet wheel 7, which is mounted beneath the disk 5. The disk 5 forms a support for a plurality of fuze holders or spindles 10 which are rotatably mounted therein and adjacent the periphery thereof and which are circumferentially spaced from one another. The number of holders 10, shown in this application, is less than the number disclosed in the hereinbefore referred to patent, but it will become readily apparent that the number of spindles or holders 10 may be varied. It will be noted that the number of teeth in ratchet wheel 7 correspond to the number of spindles 10 and said ratchet functions in conjunction with an electromagnetic means 20, which includes a plunger 27 having a rod 28, forming an extension thereof and on which is pivotally mounted a pawl 29 which normally is held in engagement with the teeth of the ratchet wheel 7 by a spring 30. The disk 5 is provided with notches 21 in its rim to receive the reduced end 22 on plunger 23 of a plunger electromagnet 24, for locking the disk 5, temporarily, at the end of each step by step motion of the disk 5, in response to the operation of the electromagnetic means 20 on the ratchet wheel 7. The electromagnets 20 and 24 are provided with springs, not shown, for projecting the plungers 27 and 23 respectively, outwardly, when said electromagnets are not energized.

The apparatus 3 is provided with two stations A and B where the testing operation is performed. At these stations the spindles 10 are revolved in the disk 5 by means of a friction drive from an electric motor, not shown, and which drives the shaft 55 which is journaled in the base 1. Shaft 55 has two drive wheels 56 and 57 keyed thereto and in which the latter is smaller in diameter than the former. Drive wheel 56 is in frictional contact with a friction idler wheel 58, which in turn, frictionally drives a spindle 10 at the testing station A by frictional engagement with a friction collar 16, which is keyed to the spindle 10. A friction idler wheel 59, which is substantially greater in diameter than the idler wheel 58, is driven by the friction wheel 57 and in turn drives a spindle 10, located at station B by engagement with the friction collar 16 thereof.

The parts previously described are fully illustrated and described in my prior patent, previously referred to, and bear the same reference characters as in the prior patent. For a more detailed disclosure of the mechanical parts, heretofore described, reference is made to my prior patent.

The structure hereinafter to be described constitutes the improvement of the present invention over my prior patent.

For better understanding of one use of the present invention, reference is had to Figure 2, wherein a fuze, designated generally 60 and of conventional construction, is shown. Fuze 60 illustrates one type of device of a character capable of being tested by the present invention and includes an element 61 which is slidably mounted lengthwise in the fuze in a bore 62 and which is connected to a firing pin in the fuze, not shown, so as to be mounted for reciprocation therewith. Mounted substantially radially of the fuze housing 63 are two plungers 64 which are disposed in substantially opposed relationship to one another and which are slidably mounted in bores 65. The bores 65 contain stop members 66 which are disposed therein behind plungers 64 and which form abutments for expansion springs 67, which urge the plungers 64 inwardly and to their positions of Figure 2, in obstructing relationship to the element 61, so as to prevent said element from being moved inwardly or downwardly beyond a certain point relatively to the housing 63, which point is insufficient to permit the firing pin, not shown, to function to detonate a primer, not shown. It will be apparent that the fuze 60 when mounted in a rotatable type projectile, not shown, and when in flight, will be rotated by the rotation of the projectile which will cause the plungers 64 to be flung outwardly by centrifugal force against the action of the springs 67 and out of the path of movement of the element 61, so that upon impact of the projectile with a target the element 61 can be driven rearwardly or downwardly, as seen in Figure 2, sufficiently to allow the firing pin of the fuze 60 to detonate the primer.

It is a purpose of this invention to provide an apparatus which will produce substantially the same rotation of the fuze 60 as is imparted to it by rotation in the projectile, in order to test the operation of the plungers 64, and thereafter to again rotate the fuze 60 at a reduced speed, at which the plungers 64 should not be flung outwardly by centrifugal force, to ascertain if the plungers operate correctly. The spindles 10 are provided with sockets 68 in their upper ends shaped and sized to seat a fuze 60 and to frictionally hold the fuze sufficiently to cause it to rotate with the spindle 10. The spindles 10 are formed of a nonmagnetic material, preferably of plastic and the fuzes 60 are also formed of nonmagnetic material except for the plungers 64 which, prior to testing, are magnetized.

The testing apparatus also includes a pair of brackets 69 which are suitably fastened to the base 1 and which carry holders 70, which are disposed adjacent the spindles 10, located at the stations A and B, and in each of which is mounted an electrical pick up coil. In the holder 70, located at station A, is mounted a pick up coil 71, and in the holder 70, located at station B, is mounted a pick up coil 72. The pick up coils 71 and 72 are positioned, by holders 70, adjacent to the plungers 64 of the fuzes 60, contained in the spindles 10, which are located at stations A and B. The pick up coil 71 has conductors 73 leading therefrom to a filter and amplifier 74 and from filter and amplifier 74 conductors lead to an electromagnet 77' which cooperates with a normally opened switch 77'' in the lead 76 from a source of A. C. to the solenoid 82. An indicator lamp bulb 77 and the electromagnet 77' are connected in parallel and are adapted to be activated by current flowing through the conductors from the filter and amplifier 74, the lamp forming a visual indicator when current is passing from pick up coil 71 through the filter and amplifier 74, which is constructed to pass an induced current of only a particular frequency, namely, the frequency which is obtained only when the spindle 10 is turning at the testing speed simulating the rotation of the fuze 60, that would be imparted to it by its projectile when in flight, causing both of the plungers 64 to be moved outwardly by centrifugal force. The pick up coil 72 has conductors 78 leading therefrom to a filter and amplifier 79, which in turn has conductors connected with an indicator lamp bulb 81 and an electromagnet 81' adapted to be activated by an induced current passing through the filter and amplifier 79, which likewise is constructed to pass an induced current from the coil 72 of only a particular frequency, namely, the frequency which is obtained when the spindle 10 is turning at the testing speed simulating the rotation of the fuze 60 that would be imparted to it by the projectile as it moves through the gun barrel. At or below this speed neither plunger 64 should be flung outwardly by centrifugal force. This simulates the condition that the fuze must undergo while in the gun barrel and still remain bore-safe. The conductor 75 leads to one contact of an electromagnet 82 which controls the passage of a pressure conduit 83, which is in turn connected to a source of compressed air, not shown. The conductor 80 is a return lead connected to the other contact of the electromagnet 82, and as seen in Figure 1, the electromagnet 82 and the conduit 83 thereof are disposed beneath a spindle 10, which is located at a remote position relatively to the stations A and B.

From the foregoing, it will be apparent that by driving the shaft 55 continuously, a plurality of fuzes 60 may be tested to ascertain if their plungers 64 are operating correctly, prior to applying the fuzes to projectiles. The driven shaft 55 drives the friction wheels 56 and 57, which are carried thereby, and which in turn drive the idler friction wheels 58 and 59, respectively, for driving the spindle 10, at the station A, at a high speed, and the spindle 10, at the station B, at a low speed. The magnetized plungers 64 in the fuze 60, contained in the spindle 10 at station A, if they function correctly, will be flung outwardly by the high speed of the rotation of said spindle to induce a current in the pick up coil 71 which will be of the correct frequency to pass the filter and amplifier 74. The magnetized plungers 64 of fuze 60, located at station B, if they function correctly will not be flung outwardly. However, if either plunger 64 functions incorrectly by being flung outwardly to an arming position, as are the plungers at station A, they will consequently induce a current of a different frequency in the pick up coil 72. The filter and amplifier 79 is constructed to pass the current thus produced to open relay 81''. It will be apparent that when the induced current is passed by the filter and amplifier 74, a circuit will be energized in which is connected the electromagnet 20, the electromagnet 24 and the electromagnet 82. As a result, the electromagnets 20 and 24, being energized, will attract the cores 27 and 23, respectively. The core 23 by moving inwardly of the electromagnet 24 will move the plunger portion 22 out of engagement with the notch 21 into which it was extending, to release the disk 5. At the same time, the core 27 will be attracted inwardly of the electromagnet 20 so that the rack bar 28, connected thereto, and by means of its engagement with the ratchet wheel 7, through its pawl 29, will turn the ratchet wheel 7 a distance equal to the distance between any two of the adjacent teeth of the ratchet wheel; and as the disk 5 is keyed to the ratchet wheel 7 and since the distance between the centers of adjacent spindles 10 is equal to the distance between adjacent teeth of the wheel 7, disk 5 will be turned in a counterclockwise direction, as seen in Figure 1, a distance so that the spindle at station A will move to station B and the spindle 10, next adjacent thereto, in a clockwise direction, will be moved to station A and the operation repeated. At the same instant that the disk is released and rotated, the electromagnet 82 is also energized to open a valve, not shown, in the conduit 83, so that a blast of air passes through the bore 84 and the small ports 85 of the spindle 10, located at station C, for ejecting the fuze 60 from the spindle 10, at station C, which fuze has previously been tested. The empty spindle, at station C, is thereafter manually reloaded with another fuze 60, to be tested, upon movement of this spindle to station D, which is located between stations A and C, and to which the spindles 10 move after leaving station C and before arriving at station A. Likewise, when this operation occurs both of the lamp bulbs 77 and 81 will be energized. It will be apparent that when this movement is completed, the pick up coil 71 will have been deenergized to deenergize the circuit of the electromagnets 20, 24 and 82, so that the cores 27 and 23 will return to their positions of Figure 1 and the valve of the electromagnet 82, not shown, will have again been closed, before another spindle has arrived at station C. Thus, this operation will be intermittently repeated automatically except for the manual loading of fuzes 60, to be tested, at station D. Should a fuze 60, fail to satisfactorily pass the test at station A, that is, should either or both plungers 64 thereof fail to move outwardly to arming positions, the circuit will not be energized due to the fact that the induced current from the pick up coil 71 will not be passed by the filter and amplifier 74 and the indicator bulb 77 will therefore not be illuminated or switch 77'' closed, thus indicating that it is the fuze at station A which is defective. As a result, the disk 5 will not be rotated nor will a fuze be blast ejected at station C, so that another fuze, which is known to be good, will then be inserted into the spindle 10, at station A, to permit the apparatus 3 to resume its normal functioning. A similar result will occur if a fuze 60 is defective, at station B, in which case one or both plungers 64 thereof would be flung outwardly by the low speed rotation, and the induced current received by the pick up coil 72 would be passed by the filter and amplifier 79, and the defect will be indicated by the bulb 81 being illuminated and the switch 81'' opened. The same operation is here again manually performed to cause resumption of normal operation of the apparatus. The friction drive, the intermittent movement of disk 5 and the air blast ejection produces an agitation of the fuzes simulating conditions encountered by the fuzes in transportation, to ascertain if the fuze plungers are subject to jamming in their bores as a result of such normal and necessary handling.

Various modifications and changes in the construction and arrangement of the parts forming the invention are contemplated and may obviously be resorted to, without departing from the spirit and scope of the invention, as hereinafter defined by the appended claims:

I claim:

1. An apparatus for testing the operation of centrifugally actuated magnetized elements, comprising means for rotating the elements at a speed to cause the elements to be actuated by centrifugal force, and electrical means disposed adjacent said elements whereby an electrical current will be induced in the electrical means by the elements, when flung outwardly by centrifugal force, to energize a visual indicator, forming a part of the electrical means and a filter interposed in the circuit of the electrical means for passing an electric current of a particular frequency to the visual indicator.

2. An apparatus for testing the operation of centrifugal, magnetized safety elements of fuzes, comprising a pair of fuze holders, means for simultaneously rotating said holders at different speeds, electrical pick up means disposed adjacent fuzes contained in the holders for picking up a current induced by the safety elements of the fuzes, and electric filters interposed in the pick up means, one of the filters passing the induced current of a frequency produced only when the safety elements, inducing the current in its pick up means, are flung outwardly by centrifugal force, and the other filter passing the induced current of a frequency produced, only when the safety elements, inducing the current in its pick up means, are not flung outwardly by centrifugal force.

3. An apparatus as in claim 2, means for rotatably supporting a plurality of the fuze holders, and electrically actuated, intermittently operated means for moving the holders into and out of engagement with the rotating means, said operating means being interposed in the circuit and between the filters.

4. An apparatus as in claim 2, and electrically energized, visual indicators interposed in the circuit, adjacent the filters, for indicating when the induced current is being passed through said filters.

5. An apparatus for testing magnetized centrifugally actuated elements of projectile fuzes, comprising a turntable, a plurality of fuze holders rotatably mounted therein, said apparatus having two testing stations, means for rotating the fuze holders at different predetermined testing speeds at the testing stations, pick up coils located at the testing stations and adjacent the fuzes contained in the holders whereby said magnetized safety elements induce in the pick up coil currents having frequencies corresponding to the rotational speeds of the magnetized safety elements, filter circuits associated with said pick up coils for passing induced currents only at the frequencies corresponding to the definite predetermined testing speeds and electrical means actuated by the output of said filter circuit for controlling the operation of the turntable.

6. An apparatus as in claim 5, said controlling means including an electrically actuated pawl and ratchet wheel for intermittently rotating the turntable to move the fuze holders into and out of positions at the testing stations.

7. The method of testing the centrifugal operation of a device having elements of magnetic material to determine its response to centrifugal force at a predetermined speed, consisting of magnetizing the elements to be tested, rotating the magnetized elements at a predetermined testing speed, generating electrical currents at frequencies corresponding to the speeds of rotation of said magnetized elements, filtering the resulting currents to pass current only of a frequency corresponding to the predetermined testing speed if the magnetized elements have been moved outwardly in response to the centrifugal force, and utilizing the filtered current to produce a visual indication that the magnetized elements have been actuated in response to the centrifugal force.

8. The method of testing the centrifugal operation of a device having elements of magnetic material to determine its response to centrifugal force at a predetermined testing speed, consisting of magnetizing the elements to be tested, rotating the magnetized elements at a predetermined testing speed, generating electrical currents at frequencies corresponding to the speeds of rotation of said magnetized elements, filtering the resulting currents to pass current only of a frequency corresponding to the predetermined testing speed if the magnetized elements have been moved outwardly in response to the centrifugal force and utilizing the filtered current to move the magnetized elements into and out of position to be revolved.

LEO T. MEISTER.

REFERENCES CITED

The following references are of record in the file of this patent:

UNITED STATES PATENTS

| Number | Name | Date |
|---|---|---|
| 591,162 | Fiske | Oct. 5, 1897 |
| 2,355,092 | Meister | Aug. 8, 1944 |
| 2,049,724 | Prescott et al. | Aug. 4, 1936 |
| 2,112,621 | Henszey et al. | Mar. 29, 1938 |
| 1,395,294 | Pierce | Nov. 1, 1921 |
| 1,171,405 | Ablon | Feb. 15, 1916 |
| 1,984,031 | Purdy | Dec. 11, 1934 |
| 2,318,856 | Hoffman | May 11, 1943 |
| 2,315,287 | Holloway | Mar. 30, 1943 |
| 2,303,424 | Bendz | Dec. 1, 1942 |
| 1,805,192 | Smith | May 12, 1931 |